United States Patent Office 2,920,040
Patented Jan. 5, 1960

2,920,040

PROCESS FOR INHIBITING CORROSION OF FERROUS METALS BY OIL WELL FLUID

Samuel E. Jolly, Ridley Park, Pa., assignor to Sun Oil Company, Philadelphia, Pa., a corporation of New Jersey No Drawing. Application December 5, 1956
Serial No. 626,320

5 Claims. (Cl. 252—8.55)

This invention relates to new compositions of matter and their use to protect metal surfaces from corrosion.

In United States Patent No. 2,736,658, issued February 28, 1956, to F. W. Pfohl et al., the use of fatty or rosin acid salts of polyamines containing at least two nitrogen atoms separated by a polymethylene group containing two to six carbon atoms, one of said atoms being connected to a radical derived from fatty (8 to 22 carbon atoms) or rosin acids, as corrosion inhibitors for ferrous metals is disclosed and claimed. These inhibitors provide good protection when used in sufficient concentration in the corrosive medium. It is often desirable however to use corrosion inhibitors in quite small concentrations, and in such cases the inhibitors of the patent do not provide sufficient protection to be satisfactory.

According to the present invention, salts of polyamines as specified above with aromatic acids as subsequently specified are provided, which salts are surprisingly superior to the patentee's fatty and rosin acid salts in that the salts according to the invention are effective in much lower concentration in the corrosive medium.

The compositions according to the invention are: salts of aromatic carboxylic acids as subsequently defined with polyamines containing at least two nitrogen atoms separated by a polymethylene group containing 2 to 6 carbon atoms, one of the nitrogen atoms being connected to a hydrocarbon radical derived from rosin acids or fatty acids having 8 to 22 carbon atoms; N-hydroxyalkyl and N-polyoxyalkylene derivatives of such salts; and protective oil and grease compositions containing such salts and derivatives.

Preferred polyamines for preparation of salts according to the invention are those having the formula $RNH[(CH_2)_mNH]_nH$, where $m$ is an integer from 2 to 6, $n$ is an integer from 1 to 5, and R is selected from the group consisting of R' and $R'CH_2$ where R' is a hydrocarbon radical attached to a carboxyl group in fatty acids or rosin acids.

In one embodiment of the invention, the radicals R and R' are the same. Such polyamines can be prepared by procedures involving, first, the conversion of the original acid or acids, R'COOH, to the corresponding amine or amines $R'NH_2$ by known methods for such conversion. The amine or amines are then converted to polyamines by suitable procedure as discussed subsequently.

In another embodiment, the radical R contains an additional methylene radical. Such polyamines can be prepared by procedures involving, first, the conversion of the original acid or acids, R'COOH, to the corresponding amine or amines $R'CH_2NH_2$ by known methods for such conversion. The amine or amines are then converted to polyamines by suitable procedure as discussed subsequently.

Polyamines according to the invention can be prepared from any suitable fatty acid or rosin acid or mixture of such acids. Mixtures of acids from natural sources can be employed, e.g. tall oil, tallow, castor oil, soybean oil, linseed oil, etc. Natural rosin acids or modified rosin acids such as dehydrogenated, hydrogenated or disproportionated rosin acids can be employed. Individual acids recovered from natural or modified natural mixtures can be employed.

Particularly preferred polyamines for preparation of salts according to the invention are those wherein $m$ is 3 and $n$ is 1 in the above formula, i.e. N-substituted trimethylene diamines. Such polyamines can be prepared for example by reacting fatty or rosin amines, $R'NH_2$ or $R'CH_2NH_2$, with acrylonitrile to form N-cyanoethyl naphthenyl amines, and hydrogenating the latter to N-naphthenyl trimethylene diamines. Polyamines wherein $m$ is 3 and $n$ is 2 or more can be prepared by further cyanoethylation and hydrogenation.

Polyamines wherein $m$ is 2 can be prepared for example by reacting fatty or rosin amines, $R'NH_2$ or $R'CH_2NH_2$, with ethylene imine at 150° C. to 225° C. in the presence of a solvent such as xylene:

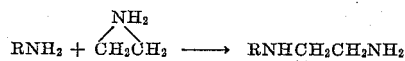

The reaction products can be further converted to polyamines wherein $m$ is 2 and $n$ is 2 or more by further reaction with ethylene imine.

Examples of salts according to the invention are the following: N-octadecenyl ethylene diamine monobenzoate, N-octyl trimethylene diamine dibenzoate, N-docosyl hexamethylene diamine monosalicylate, N-abietyl diethylene triamine trisalicylate, N-rosinyl tetramethylene pentamine tri-m-toluate,

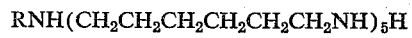

di(3,5-dimethylbenzoate) where R is the dodecyl radical, N-stearyl-N'-hydroxyethyl ethylene diamine di(3-hydroxy-5-isobutyl benzoate), N-tallow-N'-ethoxyethanol trimethylene diamine di(2-hydroxy-4-methyl benzoate), N,N'-dipalmityl diethylene triamine mono(2,3-dihydroxy benzoate), N-tetradecyl ethylene diamine di(hydroxyphenylstearate), etc.

The acid employed to make the salt according to the invention is a mononuclear aromatic carboxylic acid containing 0 to 3 hydroxyl groups directly attached to the aromatic nucleus. Preferably, the acid has the carboxyl group directly attached to the aromatic nucleus. Preferably, the acid contains not more than one hydroxyl group attached to the nucleus. The acid can if desired contain one or more alkyl side chains. Where alkyl side chains are present, they may contain a total of 1 to 10 carbon atoms. Alternatively, they may contain greater numbers of carbon atoms, for example up to a total of 30 or more. Mixtures of acids obtained by known partial oxidation, e.g. in liquid phase, of mixtures of alkyl aromatic compounds, can be employed if desired. Examples of suitable acids are: benzoic acid, salicylic acid, o-toluic acid, m-toluic acid, p-toluic acid, 3,5-dimethyl benzoic acid, p-ethyl benzoic acid, p-isobutyl benzoic acid, p-octadecyl benzoic acid, 3-methyl-5-isobutyl benzoic acid, 3,5-diamyl benzoic acid, 2,4-dimethyl benzoic acid, m-hydroxy benzoic acid, p-hydroxy benzoic acid, 2-hydroxy-4-methyl benzoic acid, 3-hydroxy-5-isobutyl benzoic acid, 2-methyl-4-hydroxy benzoic acid, phenylacetic acid, monohydroxy phenyl stearic acid, 2,3-dihydroxy benzoic acid, 2,5-dihydroxy benzoic acid, 3,5-dihydroxy benzoic acid, 2,6-dihydroxy benzoic acid, 2,3,4-trihydroxy benzoic acid, etc.

In inhibition of corrosion by oil well fluids for example, preferred salts are the polyamines partially neutralized with salicylic acid, e.g. diamine monosalicylates. Corrosion inhibition tests according to the procedure subsequently described have indicated such salts to be superior to polyamines completely neutralized with salicylic acid, and also to polyamines neutralized with other acids such as benzoic acid.

The preparation of the salts of the polyamines involves mixing the polyamine in the liquid phase and the aromatic acid, whereupon an exothermic neutralization reaction occurs. Temperatures above 100° C. are avoided since they tend to produce chemical dehydration with resultant amide formation. Satisfactory reaction to form salts occurs even though the temperature is below the melting point of the acid. Partial or complete neutralization of the basic nitrogen atoms in the polyamine can be obtained by proper choice of the molar proportions of polyamine and salicylic acid.

N-hydroxyalkyl and N-polyoxyalkylene derivatives of the polyamines previously specified can be used to prepare the salts according to the invention. Such derivatives can be prepared in known manner by reaction of an alkylene oxide, e.g. ethylene oxide, propylene oxide, 1,2-epoxybutane, 1-methyl-2,3-epoxybutane, etc. with the polyamine. Both hydroxyalkyl and polyoxyalkylene groups can be present in the molecule. Preferably, the total number of carbon atoms per molecule in such groups is within the approximate range from 2 to 20, more preferably 2 to 10.

The novel compositions according to the invention are useful for a variety of purposes, e.g. as corrosion inhibiting and detergent additives for petroleum fractions such as kerosene, lubricating oil, etc., as antisludging additives for petroleum fuels, as emulsifying agents, etc. They also may be useful as bactericidal or bacteriostatic agents. They are particularly useful for inhibiting corrosion of metal equipment used in production and transportation of oil well fluids, such corrosion being normally caused by materials such as $H_2S$, $CO_2$ and lower organic acids. The salts can be commingled with the well fluids in any suitable manner, e.g. by introducing them, either alone or dissolved in a suitable solvent such as an aromatic hydrocarbon solvent, into the well tubing or into the annulus between the tubing and the casing. The inhibitor can alternatively be incorporated in a solid stick inhibitor containing microcrystalline wax or other suitable material. The injection practices which are known for use with other organic inhibitors are generally suitable for use with the present inhibitor. Preferably, the inhibitor is added to the corrosive well fluids in amounts of 10 to 1000 p.p.m. based on the well fluids, e.g. a mixture of crude oil and brine. In addition to their corrosion inhibiting properties, the salts have detergency characteristics which make them useful in maintaining metal surfaces of well production equipment in clean condition, and in removing corrosion products or scale from corroded metal surfaces.

The compositions are useful in other corrosion inhibition applications also, being generally useful in protecting ferrous metals from corrosion, the protection being accomplished by means of a layer of the inhibiting composition on the metal surface. In using the novel compositions according to the invention as corrosion inhibitors, they can be applied directly to the metal surface which is to be protected. Preferably, however, they are first dissolved in a protective hydrocarbon oil, and the solution applied to the surface. Suitable operation in the latter instance is disclosed for different inhibitors in United States Patent No. 2,736,658 previously cited, and similar operation can be employed in the present instance. Preferred amounts of the inhibitor in the oil are those within the approximate range from 0.01 to 1.0 weight percent, though any larger amount which is soluble in the oil can be employed. The inhibitors can also be employed in greases comprising gelled hydrocarbon oils as described in United States Patent No. 2,736,658 previously cited. Preferred amounts of the inhibitor in the grease are those within the approximate range from 1 to 5 weight percent, though any larger amount which is compatible with the grease can also be employed.

The following examples illustrate the invention:

*Example I*

N-tallow trimethylene diamine disalicylate was prepared and tested as a corrosion inhibitor for oil and gas condensate wells.

The inhibitor was prepared by reacting N-tallow trimethylene diamine, as described in Pfohl et al. United States Patent No. 2,736,658, with salicylic acid in the proportions of two moles of salicylic acid per mole of the diamine. The reaction was carried out at a temperature of 150 to 200° F. The reactants were stirred together to promote the reaction. The reaction product was N-tallow trimethylene diamine disalicylate, a normally liquid material having Saybolt Universal viscosity at 130° F. of about 12,240 seconds, refractive index at 20° C. of 1.5188, and specific gravity of 1.03 at 60° F.

The inhibitor was tested by the following procedure: Approximately equal volumes of kerosene saturated with hydrogen sulfide, and of brine containing 13.24 grams per liter of $CaCl_2 \cdot 2H_2O$, 3.5 g./l. of $Na_2SO_4$, 60 g./l. of NaCl, 10.68 g./l. of $MgCl_2 \cdot 6H_2O$, 1.0 g./l. of $Na_2CO_3$, and 400 to 600 p.p.m. of $H_2S$ were placed in a bottle, together with amounts of polyamine salicylate mixture as indicated in the table below, expressed as parts per million based on the sum of the volumes of oil and brine. A cleaned and weighed ⅛" rod of mild steel was placed in the bottle, and the latter sealed. The liquids nearly filled the bottle, the remaining fluid being largely air. The bottle was placed on the periphery of a drum which was rotated at a rate of about 100 revolutions per minute for a period of 24 hours. The test was carried out at room temperature. The steel rod was then removed, electrolytically cleaned, and weighed to determine the weight loss from corrosion by the oil and brine. This weight loss was compared with that obtained in a blank run with no inhibitor, and the percent reduction in weight loss by use of the inhibitor determined. The corrosive material used in this test gives results which correlate satisfactorily with results obtained using actual well fluids comprising crude oil saturated with $H_2S$ and brine saturated with $H_2S$ and $CO_2$.

The following shows the percent protection obtained with various concentrations of inhibitor:

| Concentration in p.p.m. | Percent protection |
| --- | --- |
| 100 to 400 | 94 to 96 |
| 50 | 92 |
| 33 | 90 |
| 25 | 79 |

By way of contrast, N-tallow trimethylene diamine dioleate as described in Pfohl et al. United States Patent No. 2,736,658 gives 0% protection at 50 p.p.m. or less when tested according to similar procedure.

This example shows the unpredictable superiority of N-tallow trimethylene diamine disalicylate to N-tallow trimethylene diamine dioleate as a corrosion inhibitor.

*Example II*

N-tallow trimethylene diamine monosalicylate was prepared and tested as a corrosion inhibitor for oil and gas condensate wells. The preparation and testing were similar to that described in Example I except that one mole of salicylic acid per mole of the diamine was employed in the preparation of the salt, which was a normally liquid material having Saybolt Universal viscosity at 130° F. of about 1230 seconds, refractive index at 20° C. of 1.5018, and specific gravity of 0.968 at 60° F.

The following table shows the results obtained:

| Concentration in p.p.m. | Percent protection |
| --- | --- |
| 100 to 400 | 93 to 96 |
| 50 | 94 |
| 25 | 93 |
| 15 | 91 |

These results are superior to those obtained with the corresponding oleic acid salt.

This example shows that monosalicylate salts according to the invention are remarkably effective corrosion inhibitors.

*Example III*

N-tallow trimethylene diamine dibenzoate is prepared and tested in a generally similar manner to that described in Example I. The composition is normally liquid and has Saybolt Universal viscosity at 130° F. of about 7360 seconds, refractive index at 20° C. of 1.511 and specific gravity at 60° F. of 0.989. Highly effective corrosion inhibition is provided. Thus, N-hydrocarbon trimethylene diamine dibenzoates wherein the hydrocarbon radical contains 18 to 22 carbon atoms for example have been found to provide about 92 percent protection at 50 p.p.m. in the previously described corrosion test, whereas similar dioleate salts provide zero percent protection at 50 p.p.m. when tested in a similar manner. N-tallow trimethylene diamine monobenzoate is also a highly effective corrosion inhibiting composition. The composition is normally liquid and has Saybolt Universal viscosity at 130° F. of about 650 seconds, refractive index at 20° C. of 1.4933, and specific gravity at 60° F. of 0.932.

Generally similar results to those given in the preceding examples are obtained using other salts according to the invention, e.g. those specifically mentioned previously in the specification.

The invention claimed is:

1. Process for inhibiting corrosion of ferrous metals by oil well fluid which comprises adding to oil well fluid comprising an $H_2S$-containing mixture of crude petroleum and brine which contacts ferrous metals, a salt of (1) a polyamine having the formula $$RNH[(CH_2)_mNH]_nH$$

where $m$ is an integer from 2 to 6, $n$ is an integer from 1 to 5, and R is selected from the group consisting of R′ and R′CH$_2$ where R′ is a hydrocarbon radical derived from an acid selected from the group consisting of fatty acids having 8 to 22 carbon atoms and rosin acids, and (2) a mononuclear aromatic monocarboxylic acid containing 0 to 3 hydroxyl groups directly attached to the aromatic nucleus.

2. Process according to claim 1 wherein said monocarboxylic acid is salicylic acid.

3. Process according to claim 1 wherein said monocarboxylic acid is benzoic acid.

4. Process according to claim 1 wherein said salt is N-tallow trimethylene diamine monosalicylate.

5. Process according to claim 1 wherein said salt is N-tallow trimethylene diamine disalicylate.

References Cited in the file of this patent

UNITED STATES PATENTS

| | | |
|---|---|---|
| 2,481,585 | Freeman | Sept. 13, 1949 |
| 2,598,213 | Blair | May 27, 1952 |
| 2,641,610 | Barber | June 9, 1953 |
| 2,736,658 | Pfohl | Feb. 28, 1956 |
| 2,742,496 | Lum et al. | Apr. 17, 1956 |
| 2,756,211 | Jones | July 24, 1956 |
| 2,798,045 | Buck et al. | July 2, 1957 |
| 2,839,465 | Jones | June 17, 1958 |
| 2,840,525 | Jones | June 24, 1958 |